(12) United States Patent
Zhang et al.

(10) Patent No.: US 7,612,832 B2
(45) Date of Patent: Nov. 3, 2009

(54) METHOD AND SYSTEM FOR VIDEO CLIP COMPRESSION

(75) Inventors: Zhengyou Zhang, Bellevue, WA (US); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 754 days.

(21) Appl. No.: 11/092,389

(22) Filed: Mar. 29, 2005

(65) Prior Publication Data

US 2006/0228029 A1    Oct. 12, 2006

(51) Int. Cl.
*H04N 9/64* (2006.01)
*H04N 7/12* (2006.01)

(52) U.S. Cl. .............. 348/700; 375/240.11; 375/240.25
(58) Field of Classification Search .................. 348/700; 375/240.11, 240.25
See application file for complete search history.

(56) References Cited

U.S. PATENT DOCUMENTS

| | | | | |
|---|---|---|---|---|
| 5,594,660 A * | 1/1997 | Sung et al. | .................. | 715/203 |
| 6,437,823 B1 | 8/2002 | Zhang | ........................ | 348/187 |
| 6,476,803 B1 | 11/2002 | Zhang et al. | ................ | 345/419 |
| 6,594,616 B2 | 7/2003 | Zhang et al. | ................ | 702/152 |
| 6,606,404 B1 | 8/2003 | Zhang et al. | ................ | 382/154 |
| 6,606,406 B1 | 8/2003 | Zhang et al. | ................ | 382/154 |
| 6,608,923 B1 | 8/2003 | Zhang et al. | ................ | 382/154 |
| 6,614,429 B1 | 9/2003 | Zhang et al. | ................ | 345/420 |
| 6,639,594 B2 | 10/2003 | Zhang et al. | ................ | 345/426 |
| 6,661,913 B1 | 12/2003 | Zhang et al. | ................ | 382/154 |
| 6,665,440 B1 | 12/2003 | Zhang et al. | ................ | 382/209 |
| 6,718,062 B1 | 4/2004 | Zhang et al. | ................ | 382/218 |
| 6,771,303 B2 | 8/2004 | Zhang et al. | ............. | 348/14.16 |
| 6,771,810 B1 | 8/2004 | Zhang et al. | ................ | 382/154 |
| 6,774,889 B1 | 8/2004 | Zhang et al. | ................ | 345/173 |
| 6,807,290 B2 | 10/2004 | Liu et al. | ..................... | 382/118 |
| 6,828,972 B2 | 12/2004 | Zhang et al. | ................ | 345/473 |
| 7,050,646 B2 * | 5/2006 | Xu et al. | ...................... | 382/254 |
| 7,096,486 B1 * | 8/2006 | Ukai et al. | ..................... | 725/58 |
| 2003/0009452 A1 | 1/2003 | O'Rourke et al. | .............. | 707/3 |
| 2003/0026340 A1 * | 2/2003 | Divakaran et al. | ....... | 375/240.16 |
| 2003/0046348 A1 * | 3/2003 | Pinto et al. | .................. | 709/206 |
| 2003/0084331 A1 | 5/2003 | Dixon et al. | ................ | 713/200 |

(Continued)

FOREIGN PATENT DOCUMENTS

WO    WO 9951022 A1 *   10/1999

OTHER PUBLICATIONS

Wayne Wolf, Key Frame selection by motion Analysis, 1996, ieee, 1228-1231.*

*Primary Examiner*—Thai Tran
*Assistant Examiner*—Asher Khan
(74) *Attorney, Agent, or Firm*—Westman, Champlin & Kelly, P.A.

(57) ABSTRACT

In a method for compressing a video clip containing audio content and image content, an image and/or an audio portion of individual video frames of the video clip are analyzed. Next frame scores are calculated for the video frames. Each frame score is based on at least one image attribute of the image of the video frame, and/or an audio attribute of the audio portion of the video frame. Next, key frames are identified that have a frame score that exceeds a threshold frame score. Finally, a compressed video clip is formed in which the images of non-key frames are removed. A system for implementing the method is also disclosed.

22 Claims, 7 Drawing Sheets

U.S. PATENT DOCUMENTS

| | | | |
|---|---|---|---|
| 2003/0236905 A1 | 12/2003 | Choi et al. | 709/231 |
| 2004/0075687 A1 | 4/2004 | Oshiro et al. | 345/752 |
| 2004/0243571 A1 | 12/2004 | Judd | 707/3 |
| 2004/0268400 A1 | 12/2004 | Barde et al. | 725/94 |
| 2005/0027716 A1 | 2/2005 | Apfel | 707/100 |
| 2005/0228849 A1* | 10/2005 | Zhang | 709/200 |
| 2006/0039676 A1* | 2/2006 | Van Der Heijden et al. | 386/68 |

* cited by examiner

METHOD AND SYSTEM FOR VIDEO CLIP COMPRESSION

BACKGROUND OF THE INVENTION

The present invention generally relates to a method and system for compressing a video clip having image and audio content and, more particularly, to video clip compression that reduces the image content of the video clip based upon an analysis of one or more attributes of the video frames.

Short Message Service (SMS) or text messaging is increasing rapidly in popularity. Multimedia Messaging Service (MMS) adds rich media such as rich texts, sounds, graphics, pictures and eventually even video to SMS. It gives users a whole new experience of person-to-person communication with possibilities they can create, edit and customize at will. These capabilities extend well beyond the mobile-to-mobile world, and can involve other computing devices, such as personal digital assistants (PDA) and personal computers. Simon Buckingham, CEO of Mobile Streams believes that: "The transition from Short Message Service (SMS) to Multimedia Messaging Service (MMS) is as important on mobile phones as the transition from DOS to Windows was for the PC. It represents a revolution."

Multimedia Messaging Service (MMS)—sometimes called Multimedia Messaging System—is a communications technology developed by 3GPP (Third Generation Partnership Project) that allows users to exchange multimedia communications between capable mobile phones and other devices. An extension to the Short Message Service (SMS) protocol, MMS defines a way to send and receive, almost instantaneously, wireless messages that include images, audio, and video clips in addition to text, with the possibility of supporting the transmission of streaming video once the technology is fully developed.

One problem associated with the sending, storing, and transmission of digital video clips, that contain both image and audio content, is that they generally are very large data files, at least when compared to audio and photo files. Such files cannot generally be conveniently handled by bandwidth limited networks, such as those available for many mobile phones, and impossible to send as streaming video.

Presently, Full SMS with video can only be enabled with broadband networks (3G) which transmit between 384 and 2000 kbps (kilobits per second). As a result, commonly used lower bandwidth networks, such as 2.5G technologies (e.g., General Packet Radio Service or Enhanced Data Rates for Global Evolution) having transmission speeds between 115 and 384 kbps, are generally unable to support full video transmissions.

Embodiments of the present invention provide solutions to these and other problems, and offer other advantages over the prior art.

SUMMARY OF THE INVENTION

The present invention generally relates to video clip compression by reducing the number of images in the video frames. One aspect of the invention is directed to a method for compressing a video clip containing audio content and image content. In the method, an image and/or an audio portion of individual video frames of the video clip are analyzed. Next frame scores are calculated for the video frames. Each frame score is based on at least one image attribute of the image of the video frame, and/or an audio attribute of the audio portion of the video frame. Next, key frames are identified that have a frame score that exceeds a threshold frame score. Finally, a compressed video clip is formed in which the images of non-key frames are removed.

Another aspect of the present invention is directed to a system for performing the method. The system includes a video analyzer, a key frame extractor, and a video compiler. The video analyzer includes an output of frame scores for video frames of the video clip. Each frame score is based on at least one image attribute of an image of the video frame, and/or an audio attribute of an audio portion of the video frame. The key frame extractor includes an output identifying key frames of the video frames that have a frame score that exceeds a threshold frame score. The video compiler is configured to form a compressed video clip in which the images of non-key frames of the video clip are removed.

Other features and benefits that characterize embodiments of the present invention will be apparent upon reading the following detailed description and review of the associated drawings.

DETAILED DESCRIPTION OF ILLUSTRATIVE EMBODIMENTS

The present invention generally relates to a method and system for compressing a video clip by reducing the number of images in the image content based upon an analysis of one or more image or audio attributes of the video frames. The resultant compressed video clip preferably includes only the images of key frames that have at least one attribute that reaches a predetermined threshold. As will be explained below in greater detail, the compressed video clip that is formed in accordance with the present invention, is likely to include high quality images that are representative of important features of the original video clip. However, before describing the present invention in greater detail, a discussion of exemplary computing environments in which the present invention can be used will be provided.

Exemplary Computing Environments

Figure 1:
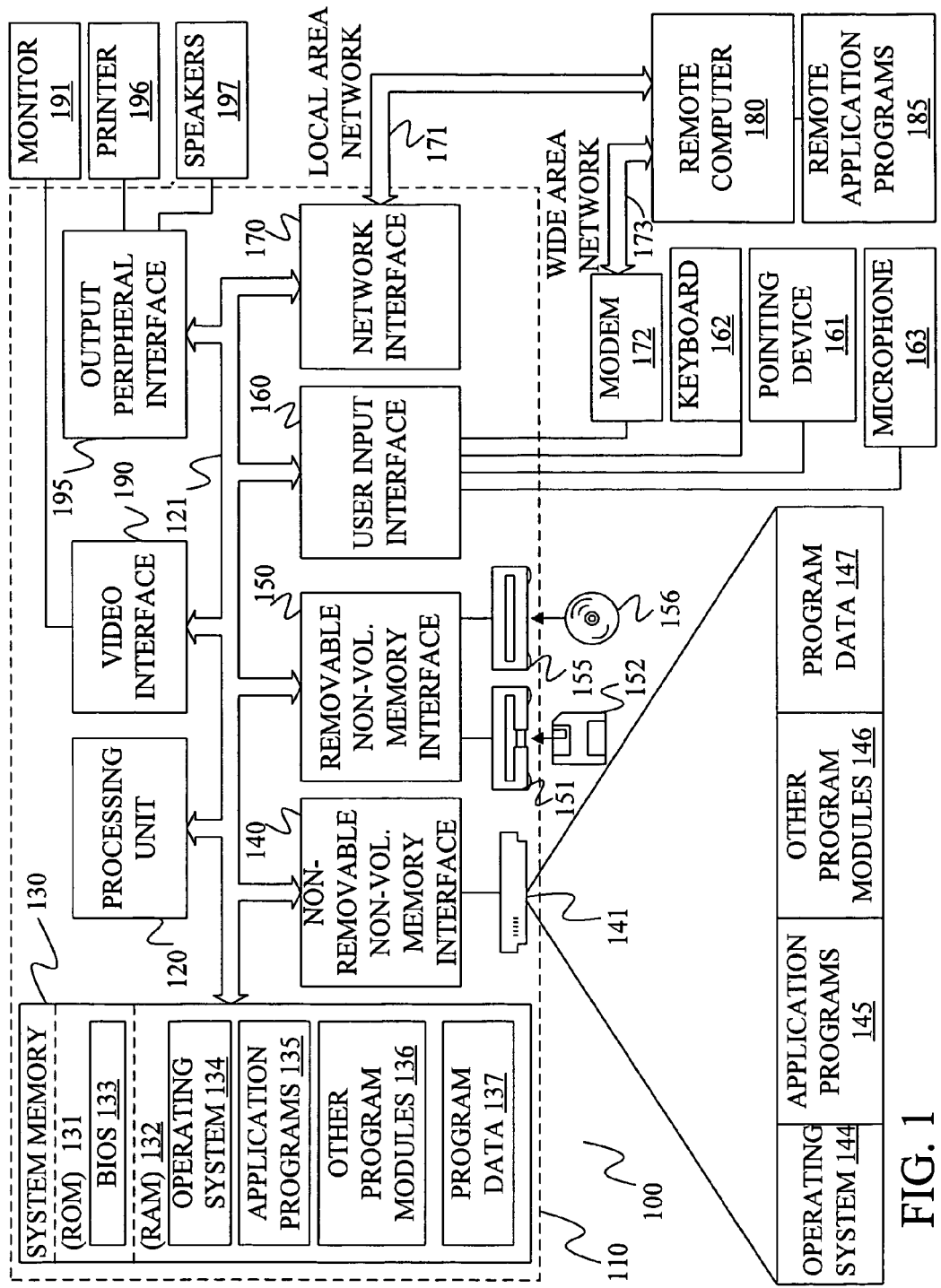
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
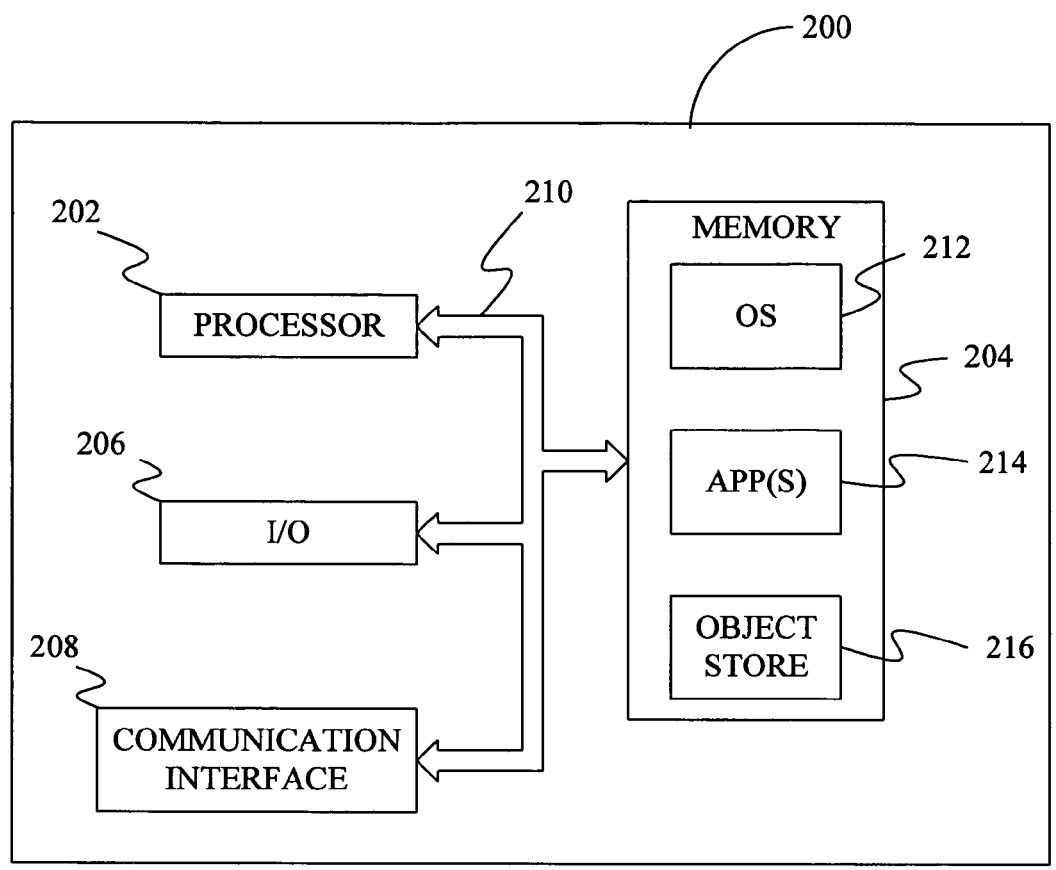
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Video Clip Compression

The present invention relates to a method and a system for compressing a video clip. The method described below is preferably implemented in a computer system through the execution of instructions stored on a computer readable medium. The system of the present invention is preferably implemented in a suitable computing device, such as those discussed above. It should be understood that blocks used to describe the system correspond to data and/or executable applications or modules stored on a computer readable medium that are configured to perform steps of the method.

Video clip compression in accordance with embodiments of the invention has many applications. For instance, mobile computing devices (e.g., mobile phones and PDA's) having low data storage capacity benefit from the data storage savings due to the reduction in the data size of the video clip that results from the compression of the present invention. The video compression of the present invention can also make it feasible for video to be transmitted over bandwidth limited networks that are incapable of handling full video files, such as those used for mobile phone applications (e.g., 2.5G networks) including Short Message Service (SMS) over which video messaging is desired, for example. Additionally, bandwidth limited networks providing Voice-Over-Internet Protocol (VoIP) can also benefit from the present invention.

Additionally, the present invention operates to maintain the images of the video frames that are likely to relate to key moments in the video clip making the resultant compressed video clip more representative of the original video sequence and more informative of its content, than that which would result from arbitrarily reducing the image content of the video clip. Additionally, the key image selection performed by the present invention operates to generate a compressed video clip that essentially provides an image summary of the original video sequence, which may be useful for video "note-taking" or other functions.

Figure 3:
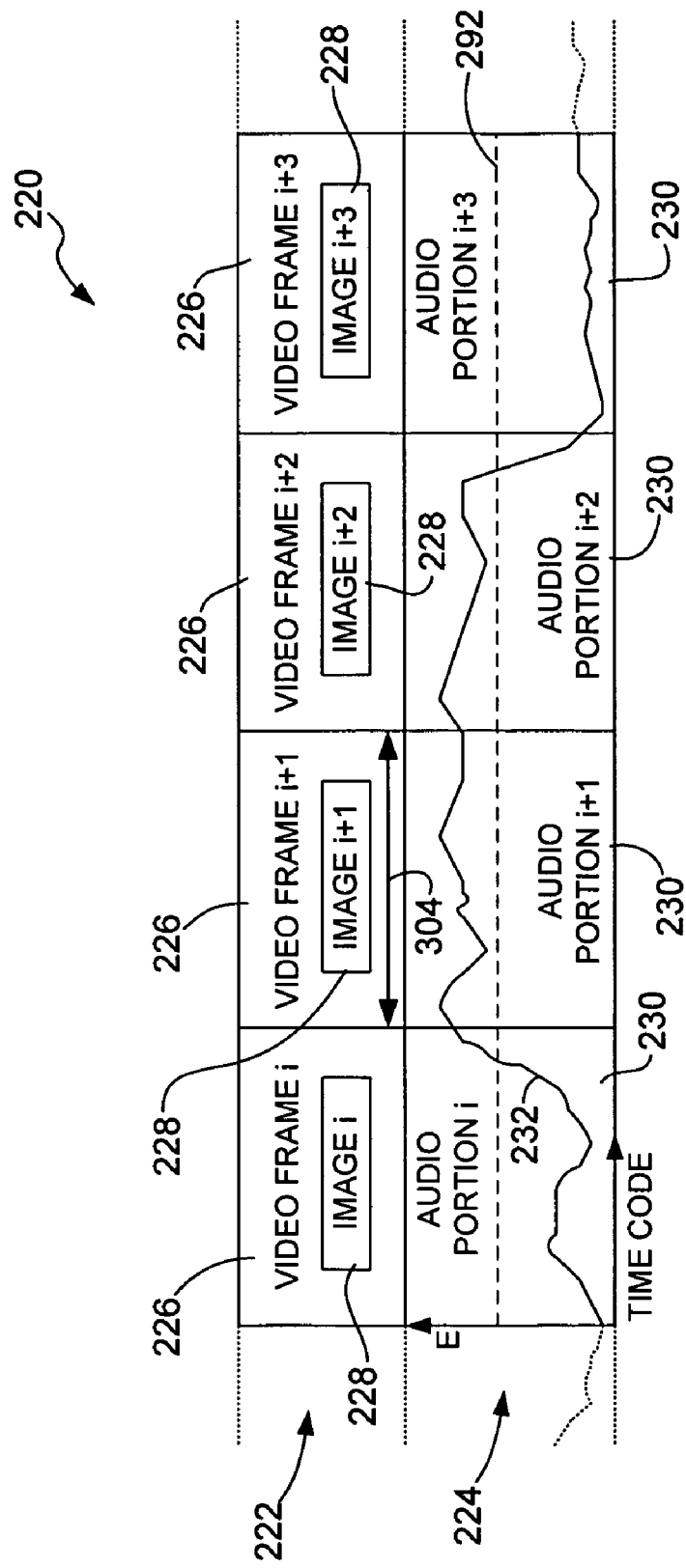
FIG. 3 is a simplified diagram of a segment of an uncompressed video clip containing image content and audio content.

FIG. 3 is a simplified diagram of a segment of an uncompressed video clip 220 containing image content 222 and audio content 224. The video clip 220 can be a video feed directly from a digital video camera (e.g., web cam, handheld video camera, video enabled mobile phone, etc.) or a video clip stored on a computer readable medium or memory of a computing device, such as those discussed above. The uncompressed video clip 220 includes a series of video frames 226 each including the image content 222 and the audio content 224. The image content 222 includes an image 228 (i.e., image data) and the audio content 224 includes an audio portion 230 (i.e., audio data). An energy level E of the audio content is illustrated as line 232. The video frames 226 can be identified by a frame number (i.e., i, i+1, i+2, etc.) or through a time code of the video clip that defines the synchronicity between the audio content and the image content.

Figure 4:
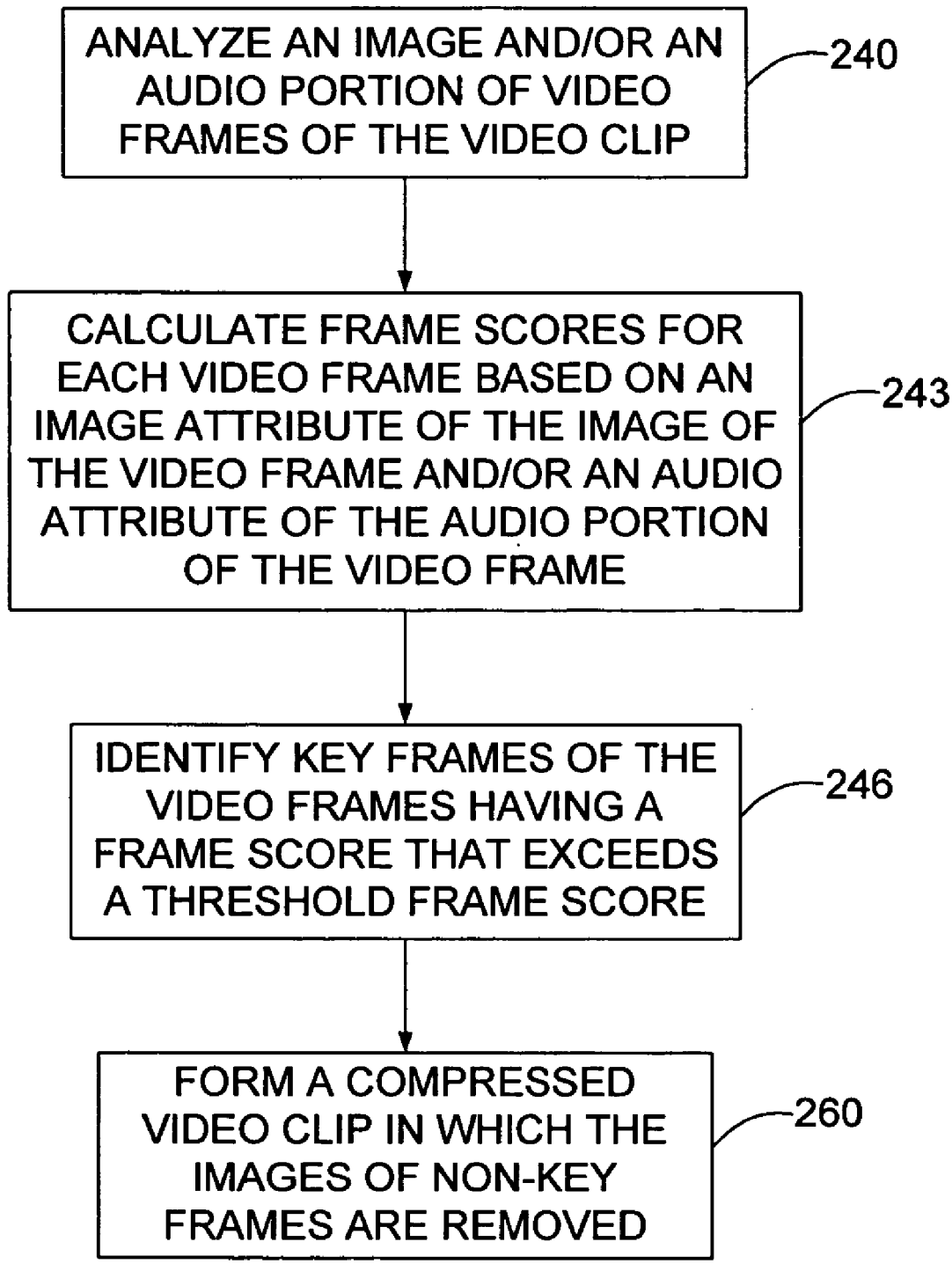
FIG. 4 is a flowchart illustrating a method for compressing a video clip in accordance with embodiments of the invention.
Figure 5:
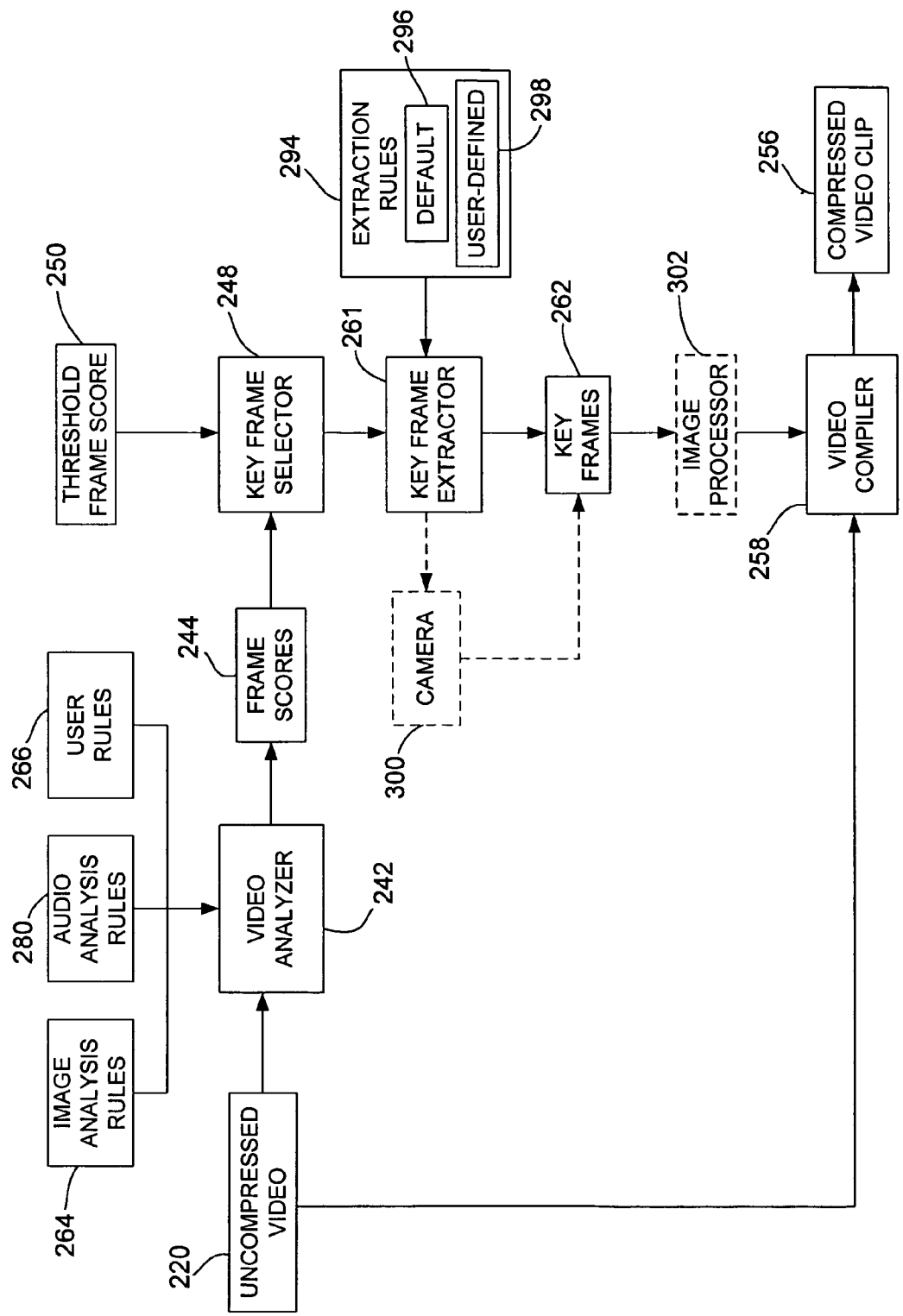
FIG. 5 is a block diagram of a system configured to implement the method of FIG. 4, in accordance with embodiments of the invention.

Embodiments of the present invention will be discussed with reference to FIGS. 4 and 5. FIG. 4 is a flowchart illustrating a method for compressing a video clip and FIG. 5 is a block diagram of a system 234 configured to implement the method, in accordance with embodiments of the invention.

At step 240 of the method, the image 228 and/or audio portion 230 of individual video frames 226 are analyzed by a video analyzer 242. The video analyzer 242, at step 243, calculates frame scores 244 for the video frames 226. Each frame score 244 is based on at least one image attribute of the image 228 of the video frame 226, and/or an audio attribute of the audio portion 230 of the video frame 226. Exemplary lists of image attributes and audio attributes are provided in FIGS. 6 and 7. Next, at step 246, key frames (i.e., key video frames) are identified by a key frame selector 248 that have a frame score 244 that exceeds a threshold frame score 250. Alternatively, non-key frames can be identified in step 246 by the key frame selector 248 corresponding to the video frames 226 whose frame scores 244 are below the threshold frame score 250. Finally, a compressed video clip 256 is formed at step 260 in which the images 228 of non-key frames are removed. Each of these method steps and the corresponding system components will be discussed in greater detail below.

In accordance with one embodiment of step 260 of the method, the key frames identified in step 246 with a key frame extractor 261 are extracted as key frames 262. The compressed video clip 256 is then formed with a video compiler 258, at step 260, that includes the extracted key frames 262.

In accordance with one embodiment of the invention, the frame scores 244 calculated in step 243 are based on a measurement of one or more attributes of the image content 222 (image attributes) and/or the audio content 224 (audio attributes) of the video frames 226. In general, it is desirable that each frame score 244 provide an assessment of the quality or importance of the image 228 and/or the audio portion 230 corresponding to the video frame 226. The higher the frame score 244 for a video frame 226, the more desirable it is to include the image content 222 and/or the audio content 224 of that video frame 226 in the final compressed video clip 256.

In accordance with one embodiment of the invention, the frame scores 244 are based on one or more attribute scores are assessed for each attribute of the image content 222 and/or the audio content 224 corresponding to a video frame 226 by the video analyzer 242. Equation 1 illustrates a calculation of a frame score 244 in accordance with embodiments of the invention. In Equation 1, n represents the number of attributes that are being analyzed by the video analyzer 242 for the image content 222 and/or the audio content 224 of a video frame 226. The measure of each attribute i results in a raw score ($r_i$) for the attribute, which is then optionally multiplied by a weight ($w_i$) for the attribute to obtain the attribute score. The frame score 244 for a video frame 226 is equal to, or is at least based on, the summation of all of the attribute scores.

$$\text{Frame score} = \sum_{i=1}^{n} r_i w_i \qquad \text{Eq. 1}$$

In accordance with one embodiment of the invention, the frame scores calculated in accordance with Equation 1 are normalized by dividing each frame score by the sum of the applied weights. Such normalization of the frame scores allows for a direct comparison between frames scores that are assessed in accordance with measurements of different attributes and/or through the application of different weights.

In accordance with another embodiment of the invention, the frame score for a video frame is selected as being the maximum raw score $r_i$ (either weighted or non-weighted) given for the measured attributes.

As mentioned above, key frames are identified in step 246 based upon a comparison of the frame score 244 of the video frames 226 to the threshold frame score 250. Preferably, the threshold frame score 250 is set high enough such that each identified key frame includes a high quality or important image content 222, and/or high quality or important audio content 224.

Image Attributes

As mentioned above, embodiments of the present invention include calculating the frame score 244 for a video frame 226 based on at least one image attribute for the image 228 of the video frame 226. The selection of the particular image attributes to be analyzed, the methods for measuring the image attributes, the settings for assessing raw scores for the measurements, the weight multipliers to be multiplied by the image attribute raw scores, and other rules and settings to be used by the video analyzer 242, are provided by image analysis rules 264. Customization of the settings can be made through an adjustment to the image analysis rules 264 and/or through user rules 266, which are set in accordance with a user's preference.

Figure 6:
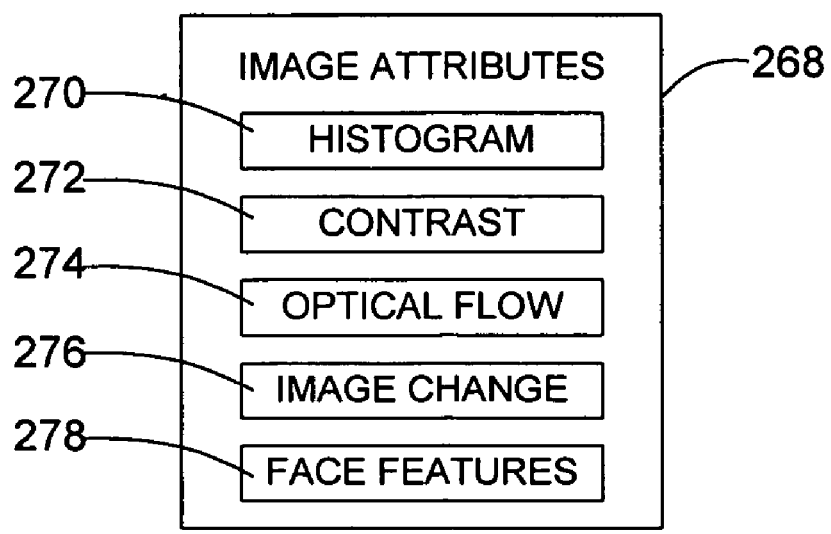
FIG. 6 is a block diagram listing image attributes in accordance with embodiments of the invention.

Exemplary image attributes 268 for the images 228 of the video frames 226 include a histogram 270 of the image, a contrast 272 of the image, an optical flow 274 of the image, an image change 276, and face features 278 in the image, as shown in block diagram of FIG. 6. Other image attributes 268 can be also be used to calculate the frame scores 244. The image attributes 268 can be analyzed in accordance with conventional methods, even though such methods have been used for purposes that are unrelated to the frame score calculation of the present invention. Accordingly, only a simplified discussion of each image attribute will be provided below.

The histogram image attribute 270 relates to an intensity level (i.e., brightness) of the pixels that form the image 228. When the pixel levels of the image are too intense, or not intense enough, the image can become indiscernible. Accordingly, histograms of quality images indicate a wide distribution in intensity levels of the pixels. The histogram of an image is generally measured by a dynamic range of the histogram. The higher the dynamic range, the higher the quality of the image.

One exemplary method of measuring the dynamic range of the histogram includes calculating a difference between low and high intensity level thresholds. The low intensity level threshold corresponds to the intensity level below which a predetermined percentage (e.g., 1%) of the pixels of the image are located on the histogram. The high intensity level threshold corresponds the intensity level above which a predetermined percentage (e.g., 1%) of the pixels of the image are located on the histogram. In general, the larger the difference between the low and the high intensity level thresholds, the higher the quality of the image. Thus, higher raw attribute scores for the histogram image attribute 270 are preferably given for images 228 having a higher dynamic range.

The contrast image attribute 272 relates to intensity level differences between neighboring pixels of the image 228. High contrast images are generally "sharper" or in focus than low contrast images. Accordingly, images having a higher contrast are generally deemed to be of a higher quality than those having a lower contrast. The measurement of the contrast image attribute 272 of an image is generally made by calculating an intensity gradient for each pixel of the image, which relates to the pixel's intensity level relative to its neighboring pixels. The intensity gradients for the pixels of the image are then averaged to obtain the desired contrast measurement. The higher the contrast image attribute 272 measurement, the higher the raw score for the image 228 of a video frame 226.

The optical flow image attribute 274 of the image 228 of a video frame relates to a measurement of movement of objects contained in the image 228. In general, the quality of an image will decrease with an increase in movement of the objects in the image, since the objects tend to appear blurry. The optical flow 274 for an image 228 is measured based on the image 228 in the preceding video frame 226. Thus, an optical flow measurement for the image 228 of video frame i+1 (image i+1), shown in FIG. 3, relies on the image (image i) of video frame i. In general, the optical flow for the image i+1 corresponds to the distance that the pixels representing the objects in the images have shifted. Typically, the optical flow measurement provides a vector indicating a direction and magnitude of the motion. In accordance with one embodiment of the invention, optical flow measurement magnitudes of the images are used to assess the raw score for the optical flow image attribute 274. Preferably, images 228 having higher magnitude optical flows 274 are given lower raw scores than images having lower magnitude optical flows 274.

The image change attribute 276 for an image 228 of a video frame 226 corresponds to a difference between the image 228 and that of the preceding video frame 226. Since the compression of the video clip 220 involves eliminating select video frames 226, it is desirable that substantially redundant consecutive images 228 be eliminated since they will not provide much in the form of new information to the viewer. In general, the image change attribute 276 relates to a difference between an image attribute 268 of the image 228 being analyzed and that of the preceding image 228. Thus, when the contrast image attribute 272 is used, the image change attribute 276 relates to a difference in the contrast measurement between the image being analyzed and that of the preceding image, for example. The raw score that is assessed for the image change 276 is preferably higher for large image attribute differences between the analyzed image and the preceding image, than it is for small image attribute differences.

The face features image attribute 278 corresponds to an analysis of faces in the image 228. The raw score for the face features image attribute 278 corresponds to a measure of one or more face features contained in the image 228, that is performed in accordance with known methods such at those described in U.S. Pat. No. 6,828,972. Examples of the face features that can be measured and used in the final assessment of the raw score for the face features image attribute 278 include: a number of faces in the image; a size of the face(s) in the image; poses (i.e., front or side view) of the face(s) in the image; the expression of the face(s) in the image (i.e., smiling, frowning, etc.); whether a mouth of the face(s) in the image are opened or closed; and whether the eyes of a face(s) in the image are opened or closed. In general, the raw score for the face feature image attribute 278 increases as it is determined that the image 228 contains more favorable facial features. A determination of which facial features are more favorable varies depending on the content of the video clip 220 and/or a user preference.

Audio Attributes

Embodiments of the present invention include calculating the frame score 244 for the video frames 226 based on at least one audio attribute for the audio portion 230 of the audio content 224 corresponding to the video frame 226. For example, the frame score 244 for video frame i+1 can be based on the audio attribute for the corresponding audio portion i+1, shown in FIG. 3.

The selection of the particular audio attributes to be analyzed, the methods for measuring the audio attributes, the settings for assessing raw scores for the measurements, the weight multipliers to be multiplied by the audio attribute raw scores, and other rules and settings to be used by the video analyzer 242, are provided by audio analysis rules 280. Customization of the settings can be made through an adjustment to the audio analysis rules 280 and/or through user rules 266, which are set in accordance with a user's preference.

Figure 7:
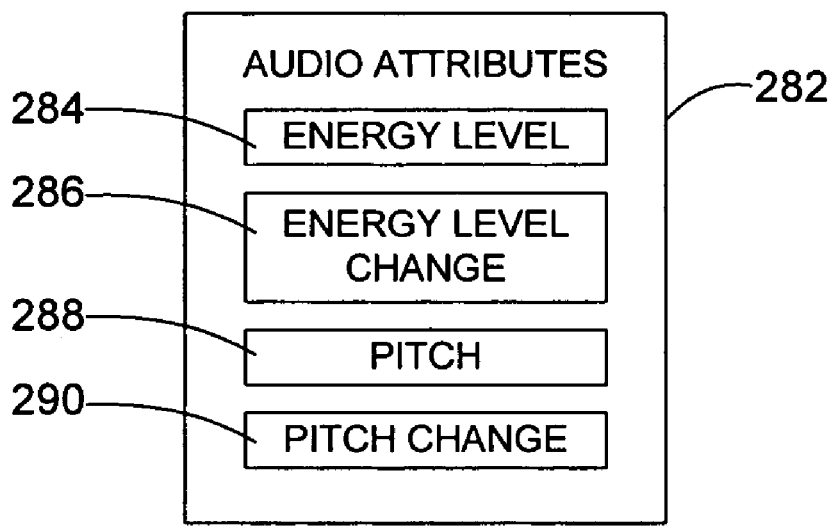
FIG. 7 is a block diagram listing audio attributes in accordance with embodiments of the invention.

Exemplary audio attributes 282 are listed in the block diagram of FIG. 7 and include an energy level 284 of the audio, a change in the energy level 286 of the audio, a pitch 288 of the audio, and a change in the pitch 290 of the audio. Other audio attributes can be also be used in the frame score calculations. The audio attributes can be analyzed in accordance with conventional methods, even though such methods have been used for purposes that are unrelated to the frame score calculation of the present invention. Accordingly, only a simplified discussion of each audio attribute will be provided below.

The energy level audio attribute 284 relates to an average or peak energy level 232 (FIG. 3) of the audio portion 230. High or low raw scores can be assessed for the audio portion 230 based on a measurement of an average or peak energy level 232 of the audio portion. Alternatively, the raw score can be assessed based on the average or peak energy level exceeding or falling below a corresponding threshold, as indicated by dashed line 292.

The change in energy level audio attribute 286 relates to a difference in the energy level 232 of the audio portion 230 being analyzed and the preceding audio portion 230, such as audio portion i+1 and audio portion i (FIG. 3), respectively. In accordance with one embodiment of the invention, the larger the energy level difference, the higher the raw score for the audio portion being analyzed. This setting is based on a belief that changes in the audio energy level 232 generally correspond to changes in the scene captured in the video clip 220. As a result, the detection of a significant audio change likely indicates that a significant change in the image 228 of the video frame 226 being analyzed and that of the previous video frame 226.

The pitch audio attribute 288 relates to a measure of the pitch in the audio portion 230 being analyzed. A high pitch in the audio portion 230 may indicate excitement (i.e., for vocalized audio) and, therefore, indicate an important video frame 226 that should be included in the compressed video clip 256. Accordingly, one embodiment of the invention provides higher attribute scores for audio portions 230 having higher pitch audio content 224 than those having lower pitch audio content 224.

The change in pitch audio attribute 290 relates to a difference in the pitch of the audio portion 230 being analyzed and the preceding audio portion 230. In accordance with one embodiment of the invention, the larger the pitch difference, the higher the raw score for the audio portion 230 being analyzed. As with the change in energy level difference, this setting is based on a belief that changes in the pitch in the audio content 224 generally correspond to changes in the scene captured in the video clip 220. Therefore, video frames 226 corresponding to audio portions 230 having a large measured change in pitch relative to that of the preceding video frame 226, are likely to be good choices as key video frames.

Key Frames Extraction

In order to provide the desired compression to the video clip 220, a maximum key frame rate for the key frames is preferably established. Additionally, it is desirable to establish a minimum key frame rate to avoid prolonged viewing of a single video image 228. In accordance with one embodiment of the invention, the key frames 262 that are extracted by the key frame extractor 254 in step 252 of the method (FIG. 4) are preferably selected in accordance with extraction rules 294 including default rules 296 and/or user-defined rules 298, shown in FIG. 5. The extraction rules 294 define the amount of compression that is desired and, thus, set a maximum frame rate for the key frames in the compressed video clip 256. As a result, some of the key frames identified by the key frame selector 248 may be eliminated as candidate key frames to be extracted and later compiled into the final video clip 256.

Additionally, the rules 294 can set a minimum frame rate for the key frames to be used in the compressed video clip 256. In accordance with one embodiment of the invention, when the key frame selector 248 identifies fewer key frames than the minimum frame rate would allow, video frames that were not necessarily identified as key frames can be extracted as elements of the key frames 262 by the key frame extractor 254. Preferably, the unidentified key frames having higher frame scores 244 are selected over those having lower frame scores 244 for this purpose.

In accordance with another embodiment of the invention, such minimum and maximum frame rates are used to control the identification of the key frames by the key frame selector 248.

High Resolution Image Key Frame Extraction

Some video cameras include a photo mode, in which images are captured at a higher resolution than the images 228 of the video frames 226. In accordance with another embodiment of the invention, the key frame extractor 254 is configured to trigger the high resolution camera 300 of the video camera when the key frame selector 248 identifies the existence of a key frame. The high resolution image is then used to replace the key frame identified by the key frame selector 248 and is extracted as one of the key frames 262. This aspect of the present invention is also useful in determining when a camera should generally capture an image of a scene even when compression of a video clip is not desired.

Post Key Frame Processing

One embodiment of the invention includes the ability to process the image and audio content for the compressed video clip 256. Such processing includes image processing to enhance the image attributes 268 of the key frame images 228, add text to an images, crop the images, color the images, and other modifications to the key frame images using known techniques. Audio processing includes adjusting the audio attributes 282 of the audio content and editing the audio content, for example.

In accordance with one embodiment of the invention, the images 228 of the extracted key frames 262 are modified by an optional image processor 302 prior to forming the compressed video clip 256. The image processing is preferably performed automatically in accordance with default or user-defined settings. In accordance with embodiments of the invention, the image processing performed by the image processor 302 modifies at least one image attribute 268 of the key frame images 228, such as image contrast, image brightness (i.e., histogram adjustment), and image hue.

In accordance with another embodiment of the invention, the image processor 302 is configured to enhance the sharpness of the images 228 of the extracted key frames 262 using the images 228 of the neighboring video frames 226. Such sharpness enhancing image processing is performed using known techniques through a pixel analysis of the neighboring images. The resultant modified images generated by the image processor preferably replace the original images 228 of the extracted key frames 262 for use in the compressed video clip 256.

Forming the Compressed Video Clip

As mentioned above, one embodiment of step 260 of the method (FIG. 4), in which the compressed video clip 256 is formed, includes eliminating the images 228 of non-key video frames in the uncompressed video clip 220. One manner in which this is accomplished is by assembling the compressed video clip by synchronizing the extracted key frames 262 with the audio content 224 of the video clip 220 using the video compiler 258.

As mentioned above, the video clip 220 includes a time code that identifies the relationship of the video frames 226 and the audio portions 230 such that they can be reassembled in a synchronous manner by the video compiler 258 using conventional methods. The video frames 226 of the video clip 220 each include a time code period 304 (FIG. 3) corresponding to the period of time the image 228 is displayed and the duration of the corresponding audio portion 230. However, there are gaps in the sequence of images 228 as a result of the elimination of the images 228 corresponding to non-key frames. As a result, a traditional synchronization between the key frames 262 and the audio content 224 would result in image gaps where no image content 222 is present.

Figure 8:
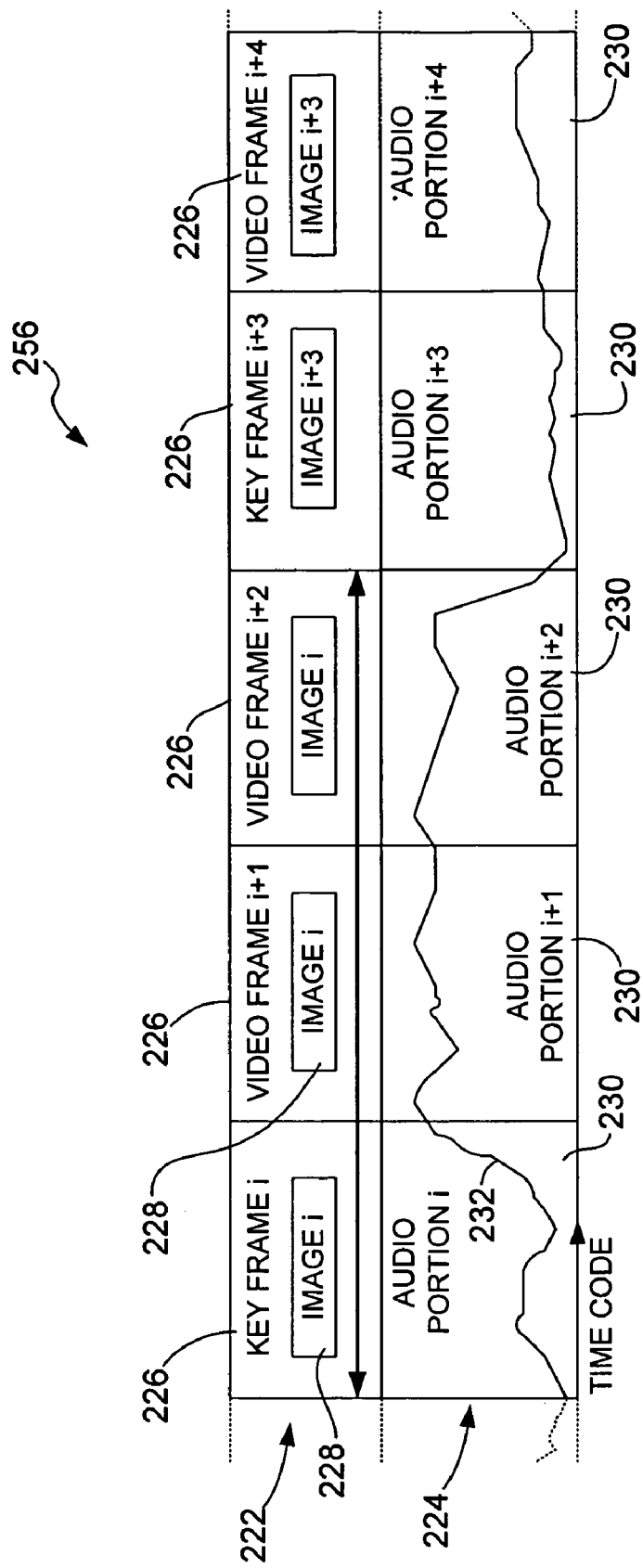
FIG. 8 is a simplified diagram of a portion of a compressed video clip in accordance with embodiments of the invention.

In accordance with one embodiment of the invention, the image gaps are eliminated in the compressed video clip 256 to provide a nearly continuous slideshow of images 228 by extending the period over which images 228 of the key video frames are displayed until the subsequent key video frame. In other words, an image i corresponding to a key frame 262 is preferably displayed in the compressed video clip 256 from video frame i through video frame i+2 to cover the missing images i+1 and i+2 corresponding to non-key frames, as shown in FIG. 8. As a result, the image i is synchronized with or is displayed during the playback of the audio portions 230 corresponding to video frames i through i+2. In accordance with one embodiment of the invention, the time code period 304 for the image i of the key video frame i is extended to the key video frame i+3 to cover the image gaps caused by the missing images of video frames i+1 and i+2 that were not selected as key video frames. Alternatively, the images 228 of the key video frames 262 (e.g., image i) are replicated in the subsequent video frames 226 until the next key video frame 262 is reached, as shown in FIG. 8.

Although the present invention has been described with reference to particular embodiments, workers skilled in the art will recognize that changes may be made in form and detail without departing from the spirit and scope of the invention.

What is claimed is:

1. A method for compressing a video clip, implemented by a computer comprising a tangible storage medium, the method comprising:
    analyzing at least one of an image and an audio portion of individual video frames of the video clip;
    calculating frame scores for the individual video frames, each frame score based on at least one of an image attribute of the image of the video frame and an audio attribute of the audio portion of the video frame;
    identifying key frames of the video frames having a frame score that exceeds a threshold frame score;
    forming a compressed video clip in which the images of non-key video frames are removed, the compressed video clip comprising the images of the key frames, the audio portions of the key frames and the audio portions of the non-key video frames.

2. The method of claim 1, wherein forming a compressed video clip in which the images of non-key video frames are removed includes synchronizing the images of the identified key frames with the audio portions of the key frames and the non-key video frames.

3. The method of claim 1, wherein:
each video frame includes a time code period; and
the method further comprises filling in image gaps of the non-key video frames of the compressed video clip with the images of the key frames including extending the time code period for the images of the key frames.

4. The method of claim 1, wherein:
each frame score is based on a contrast measurement of the image of the video frame, which indicates a relative intensity difference between neighboring pixels of the image of the video frame; and
calculating frame scores for the individual video frames comprises assigning higher frame scores to the video frames whose images have a higher relative intensity difference between neighboring pixels than the video frames whose images have a lower relative intensity difference between neighboring pixels.

5. The method of claim 4, wherein each frame score is based on a change in pitch of the audio portion from the audio portion of a preceding video frame.

6. The method of claim 1 including modifying at least one of the images of the key frames.

7. A system for compressing a video clip comprising:
a video analyzer having an output of frame scores for video frames of the video clip, each frame score based on at least one of an image attribute of an image of the video frame and an audio attribute of an audio portion of the video frame;
a key frame selector having an output identifying key frames of the video frames having a frame score that exceeds a threshold frame score; and
a video compiler configured to form a compressed video clip in which the images of non-key frames of the video clip are removed, the compressed video clip comprising the images of the key frames, the audio portions of the key frames and the audio portions of the non-key video frames.

8. The system of claim 7, wherein:
each frame score is based on contrast measurement of the image of the video frame, which indicates a relative intensity difference between neighboring pixels of the image of the video frame; and
the video analyzer assigns higher frame scores for the individual video frames whose images have a higher relative intensity difference between neighboring pixels than the video frames whose images have a lower relative intensity difference between neighboring pixels.

9. The system of claim 8, wherein each frame score is based on a change in pitch of the audio portion from the audio portion of a preceding video frame.

10. A tangible computer storage medium including instructions executable by a microprocessor of a computing device for compressing a video clip, the instructions comprising:
instructions for analyzing at least one of an image and an audio portion of individual video frames of the video clip;
instructions for calculating frame scores for the individual video frames, each frame score based on at least one of an image attribute of the image of the video frame and an audio attribute of the audio portion of the video frame;
instructions for identifying key frames having a frame score that exceeds a threshold frame score; and
instructions for forming a compressed video clip comprising the images and audio portions of the key frames and the audio portions of the non-key frames, wherein the images of the non-key frames are not included in the compressed video clip.

11. The instructions of claim 10, wherein:
each frame score is based on a contrast measurement of the image of the video frame, which indicates a relative intensity difference between neighboring pixels of the image of the video frame; and
instructions for calculating frame scores for the individual video frames comprise instructions for assigning higher frame scores to the video frames whose images have a higher relative intensity difference between neighboring pixels than the video frames whose images have a lower relative intensity difference between neighboring pixels.

12. The instructions of claim 11, wherein each frame score is based on a change in pitch of the audio portion from the audio portion of a preceding video frame.

13. The method of claim 1, further comprising filling in image gaps of the non-key video frames of the compressed video clip with the images of the key frames.

14. The method of claim 1, wherein:
each frame score is based on a histogram of the image of the video frame, from which a dynamic range for the image is obtained; and
calculating frame scores for the individual video frames comprises assigning higher frame scores to the video frames whose images have a higher dynamic range than the video frames whose images have a lower dynamic range.

15. The method of claim 1, wherein:
each frame score is based on a measurement of a magnitude of optical flow of the image of the video frame; and
calculating frame scores for the individual video frames comprises assigning higher frame scores to the video frames whose images have a lower magnitude of optical flow than the video frames whose images have a higher magnitude of optical flow.

16. The system of claim 7, wherein the video compiler is further configured to fill in image gaps of the non-key video frames of the compressed video clip with the images of the key frames.

17. The system of claim 7, wherein the video compiler is further configured to extend a time code period for the images of the key frames into the non-key video frames of the compressed video clip.

18. The method of claim 7, wherein:
each frame score is based on a histogram of the image of the video frame, from which a dynamic range for the image is obtained; and
the video analyzer assigns higher frame scores for the individual video frames whose images have a higher dynamic range than the video frames whose images have a lower dynamic range.

19. The method of claim 7, wherein:
each frame score is based on a measurement of a magnitude of optical flow of the image of the video frame; and
the video analyzer assigns higher frame scores to the video frames whose images have a lower magnitude of optical flow than the video frames whose images have a higher magnitude of optical flow.

20. The instructions of claim 10, further comprising instructions for filling in image gaps of the non-key video frames of the compressed video clip with the images of the key frames.

21. The instructions of claim 10, wherein:
each frame is based on a histogram of the image of the video frame, from which a dynamic range for the image is obtained; and
instructions for calculating frame scores for the individual video frames comprise assigning higher frame scores to the video frames whose images have a higher dynamic range than the video frames whose images have a lower dynamic range.

22. The instructions of claim 10, wherein:

each frame score is based on a measurement of a magnitude of optical flow of the image of the video frame; and instructions for calculating frame scores for the individual video frames comprise assigning higher frame scores to the video frames whose images have a lower magnitude of optical flow than the video frames whose images have a higher magnitude of optical flow.

* * * * *